United States Patent
Kang

(10) Patent No.: US 9,124,806 B1
(45) Date of Patent: Sep. 1, 2015

(54) APPARATUS AND METHOD FOR CORRECTING IMAGE

(71) Applicant: SAMSUNG ELECTRO-MECHANICS CO., LTD., Suwon-Si, Gyeonggi-Do (KR)

(72) Inventor: Jin Yong Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/279,855

(22) Filed: May 16, 2014

(30) Foreign Application Priority Data

Feb. 17, 2014 (KR) .................. 10-2014-0017767

(51) Int. Cl.
  *G03B 17/00* (2006.01)
  *H04N 5/232* (2006.01)
(52) U.S. Cl.
  CPC .................. *H04N 5/23254* (2013.01)
(58) Field of Classification Search
  CPC ........................................... G03B 5/00
  USPC .................................... 396/55, 114
  See application file for complete search history.

(56) References Cited

U.S. PATENT DOCUMENTS

| 2008/0129831 | A1* | 6/2008 | Cho et al. ............... 348/208.16 |
| 2008/0158371 | A1* | 7/2008 | Trescott ................... 348/208.7 |
| 2011/0222764 | A1  | 9/2011 | Kim et al. |
| 2012/0169891 | A1* | 7/2012 | Washisu et al. ........... 348/208.2 |

FOREIGN PATENT DOCUMENTS

| KR | 10-2011-0103205 A | 9/2011 |
| KR | 10-2013-0065603 A | 6/2013 |
| WO | 2013/085355 A1    | 6/2013 |

* cited by examiner

*Primary Examiner* — Clayton E Laballe
*Assistant Examiner* — Dennis Hancock
(74) *Attorney, Agent, or Firm* — NSIP Law

(57) ABSTRACT

An apparatus for correcting an image may include a first correction unit measuring movement of a camera module and a position of a lens in the camera module and adjusting the position of the lens in the camera module in accordance with the movement, and a second correction unit calculating error vectors using the measured movement value of the camera module and the position value of the lens and correcting an image from the camera module using the error vectors.

23 Claims, 7 Drawing Sheets

APPARATUS AND METHOD FOR CORRECTING IMAGE

CROSS-REFERENCE TO RELATED APPLICATION

This application claims the benefit of Korean Patent Application No. 10-2014-0017767 filed on Feb. 17, 2014, with the Korean Intellectual Property Office, the disclosure of which is incorporated herein by reference.

BACKGROUND

The present disclosure relates to an apparatus and a method for correcting an image.

As camera modules in digital imaging apparatuses such as digital cameras or smart phones have been reduced in size, camera shake has become an issue. The issue of camera shake refers to motion blur appearing on an image captured by a camera due to camera motions such as movement and rotation during image exposure.

To overcome this problem, existing digital imaging apparatuses employ Optical Image Stabilization (OIS) technology that corrects for user hand shake by adjusting the position of a lens by the amount of hand shake movement or Digital Image Stabilization (DIS) that performs post-correction on a captured image using a motion point spread function.

In the OSI scheme, however, an error between the amount of hand shake measured by a gyro sensor and the actual movement amount of a lens may occur, so that motion blur corresponding to the error may remain in captured images.

Further, in the case of the DIS scheme, although it has the advantage of low manufacturing costs, it has poor performance in removing motion blur, as compared to the OIS scheme.

SUMMARY

An exemplary embodiment in the present disclosure may provide an apparatus and a method for correcting an image in which error vectors are calculated based on movement of a camera sensed by a first sensor and a position of a lens sensed by a second sensor, and an image is corrected based thereon, so that a clearer image may be obtained.

According to an exemplary embodiment in the present disclosure, an apparatus for correcting an image may include: a first correction unit measuring movement of a camera module and a position of a lens in the camera module and adjusting the position of the lens in the camera module in accordance with the movement; and a second correction unit calculating error vectors using the measured movement value of the camera module and the position value of the lens and correcting an image from the camera module using the error vectors.

The second correction unit may include: an error vector calculation unit calculating the error vectors using the measured movement value of the camera module and the position value of the lens; and an image correction unit correcting the image from the camera module using the error vectors.

The second correction unit may include: an error vector calculation unit calculating the error vectors using the measured movement of the camera module and the position of the lens; and an image correction unit correcting the image from the camera module using the error vectors.

The apparatus may further include a timing control unit transmitting the calculated error vectors in response to a state of a shutter of the camera module to the image correction unit.

The timing control unit may extract error vectors calculated while the shutter is open from among the calculated error vectors so as to transmit the error vectors to the image correction unit.

The timing control unit may include: a timer outputting a delay time corresponding to a time difference in the case of a time difference between a time at which an on/off signal for the shutter transmitted from the camera module is transmitted and when the shutter is actually opened/closed; and a delay buffer applying the delay time to the error vectors transmitted from the error vector calculation unit so as to transmit the error vectors to the image correction unit.

The first correction unit may include: a first sensor measuring movement of the camera module; a lens control unit adjusting the position of the lens in the camera module in accordance with the movement of the camera module measured by the first sensor; and a second sensor measuring the position of the lens.

The lens control unit may adjust the position of the lens in such a manner as to counteract the movement of the camera module sensed by the first sensor.

The first sensor may sense angular velocity of the camera module, and the lens control unit may calculate a motion vector of the lens corresponding to the angular velocity of the camera module sensed by the first sensor and may adjust the position of the lens according to the calculated motion vector of the lens.

The second correction unit may compare a movement distance value corresponding to an angular velocity value sensed by the first sensor with a position value of the lens sensed by the second sensor so as to calculate an error vector.

The motion vector may be calculated by integrating the angular velocity value sensed by the first sensor.

The lens control unit may include: a motion vector calculation unit calculating a motion vector of the lens corresponding to the movement of the camera module sensed by the first sensor; and a lens drive unit adjusting the position of the lens based on the calculated motion vector of the lens.

The motion vector calculation unit may be a PID controller receiving a feedback signal indicating the position of the lens from the second sensor to calculate the motion vector.

The first sensor may be a gyro sensor detecting angular velocity of the camera module.

The second sensor may be a hall sensor detecting the position of the lens.

According to an exemplary embodiment in the present disclosure, an apparatus for correcting an image may include: a gyro sensor sensing angular velocity of a camera module; a lens control unit calculating a motion vector corresponding to the sensed angular velocity and adjusting a position of a lens in the camera module based on the motion vector; a hall sensor sensing the position of the lens; an error vector calculation unit comparing a movement distance value corresponding to an angular velocity value of the camera module sensed by the gyro sensor with a position value of the lens sensed by the hall sensor so as to calculate error vectors; a timing control unit extracting error vectors calculated while a shutter of the camera module is open from among the calculated error vectors; and an image correction unit correcting an image captured by the lens based on the extracted error vectors.

The lens control unit may calculate a motion vector of the lens corresponding to the angular velocity of the camera module sensed by the gyro sensor and adjust the position of the lens based on the calculated motion vector of the lens.

The motion vector may be calculated by integrating the angular velocity value sensed by the gyro sensor.

The lens control unit may include: a motion vector calculation unit calculating a motion vector of the lens corresponding to angular velocity of the camera module sensed by the gyro sensor; and a lens drive unit adjusting the position of the lens based on the calculated motion vector of the lens.

The motion vector calculation unit may be a PID controller receiving a feedback signal indicating the position of the lens from the hall sensor to calculate the motion vector.

According to an exemplary embodiment in the present disclosure, a method for correcting an image may include: a) sensing movement of a camera module; b) adjusting a position of a lens in the camera module in accordance with the sensed movement of the camera module; c) sensing the position of the lens; d) calculating error vectors based on the sensed movement of the camera module and the sensed position of the lens; and e) correcting an image from the camera module based on the error vector.

a) the adjusting of the position of the lens may include calculating a motion vector of the lens corresponding to the sensed movement of the camera module; and adjusting the position of the lens based on the calculated motion vector of the lens.

The method may further include: extracting valid error vectors calculated while the shutter of the camera module is open from among the calculated error vectors, between d) the calculating of the error vectors and e) the correcting of the image, wherein e) the correcting of the image includes correcting the image using the calculated valid error vectors.

Operations a) to d) may be repeatedly performed a predetermined number of times depending on the period of time for which the shutter of the camera module is open.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
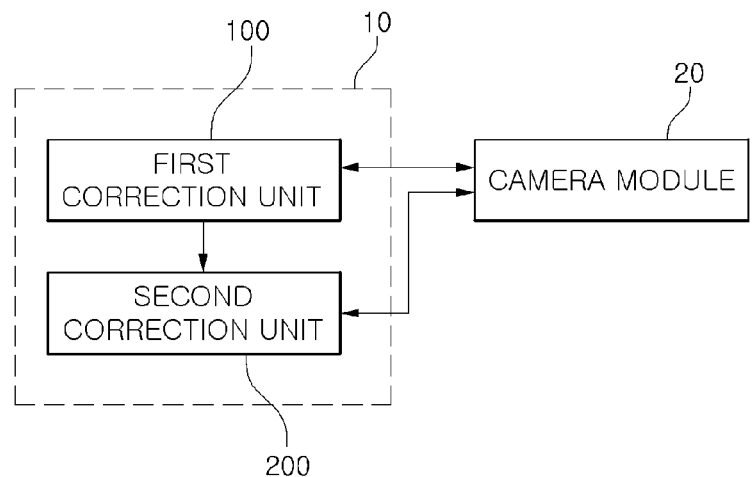
FIG. 1 is a block diagram of an apparatus for correcting an image according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram of an apparatus for correcting an image according to an exemplary embodiment of the present disclosure.

Referring to FIG. 1, the apparatus 10 for correcting an image according to the exemplary embodiment of the present disclosure may include a first correction unit 100 and a second correction unit 200.

The apparatus 10 for correcting an image may be installed in a digital imaging device such as a digital camera or a smart phone along with a camera module 20 and may serve to correct an image captured by the camera module 20. The camera module 20 may include a lens 22 through which light passes, an image generation unit 24 that receives the light so as to generate an image signal, and a shutter 26.

The first correction unit 100, when capturing an image using the camera module 20, may serve to sense the hand shake of the camera module 20 and move the lens 22 in the camera module 20 in accordance with the hand shake so as to prevent motion blur caused by the hand shake of the camera module 20.

The second correction unit 200 may correct an image captured by the camera module 20 in accordance with the sensed amount of hand shake of the camera module 20 and the corresponding position of the lens 22.

In an exemplary embodiment, the second correction unit 200 may compare a movement value of the camera module 20 with a position value of the lens 22 so as to calculate error vectors and may use the error vectors to correct the image captured by the camera module 20.

The first and second correction units 100 and 200 will be described below in more detail with reference to FIGS. 2 through 7.

Figure 2:
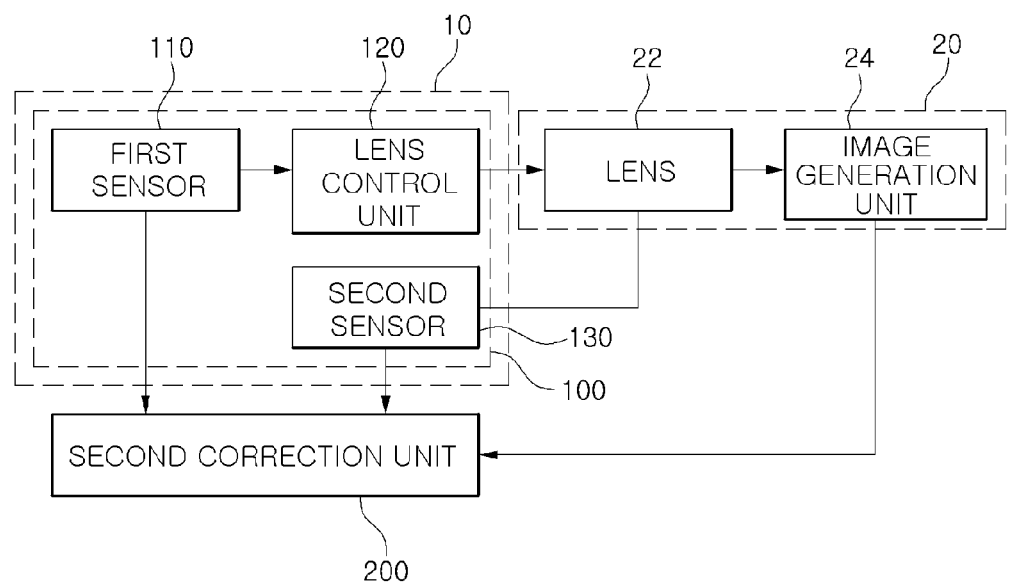
FIG. 2 is a block diagram of an example of the first correction unit illustrated in FIG. 1.

FIG. 2 is a block diagram of an example of the first correction unit 100 illustrated in FIG. 1.

In the example illustrated in FIG. 2, the first correction unit 100 may include a first sensor 110, a lens control unit 120, and a second sensor 130.

The first sensor 110 may sense the movement of the camera module 20. In an exemplary embodiment, the first sensor 110 may be a gyro sensor that measures angular velocity of the camera module 20. The components of the angular velocity may include a pitch value or a yaw value. That is, the first sensor 110 may measure a pitch value and a yaw value of the camera module 20 and may output the measured values to the lens control unit 120.

The lens control unit 120 may adjust the position of the lens 22 in accordance with the movement of the camera module 20 sensed by the first sensor 110. In an exemplary embodiment, the lens control unit 120 may adjust the position of the lens 22 in the opposite direction to the movement of the camera module 20.

Specifically, the lens control unit 120 may calculate a motion vector corresponding to the angular velocity of the camera module 20 sensed by the first sensor 110 and may adjust the position of the lens 22 in accordance with the calculated motion vector. The motion vector may be calculated by integrating the angular velocity value. The lens control unit 120 may be operated only while a shutter 26 of the camera module 20 is open.

The configuration of the lens control unit 120 will be described in more detail with reference to FIG. 3.

The second sensor 130 may sense the position of the lens 22 of the camera module 20. In an exemplary embodiment, the second sensor 130 may be a hall sensor. The second sensor 130 may sense the position of the lens 22 and may output it to the error vector calculation unit 210.

Figure 3:
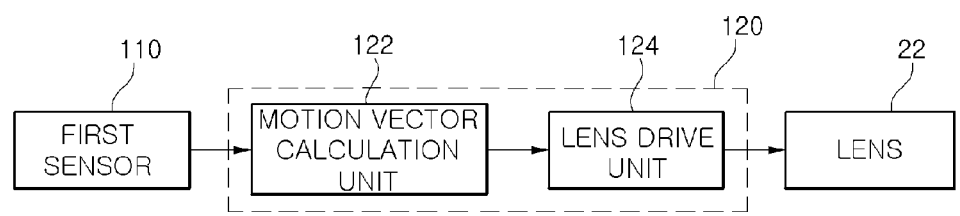
FIG. 3 is a block diagram of an example of the lens control unit illustrated in FIG. 2.
Figure 4:
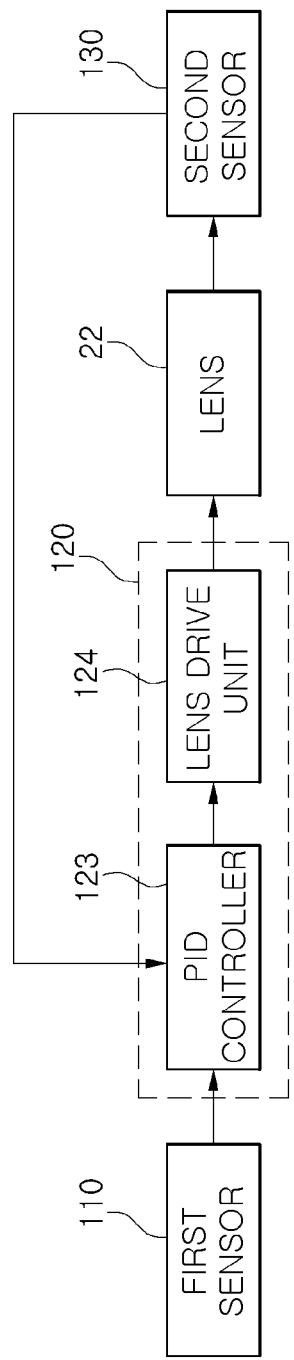
FIG. 4 is a block diagram of another example of the lens control unit illustrated in FIG. 2.

FIG. 3 is a block diagram of an example of the lens control unit illustrated in FIG. 2, and FIG. 4 is a block diagram of another example of the lens control unit illustrated in FIG. 2.

In the example illustrated in FIG. 3, the lens control unit 120 according to an exemplary embodiment of the present disclosure may include a motion vector calculation unit 122 and a lens drive unit 124.

The motion vector calculation unit 122 may calculate a motion vector of the lens 22 in accordance with the movement of the camera module 20 sensed by the first sensor 110. That is, in order to prevent motion blur occurring due to the hand shake of the camera module 20, the motion vector calculation unit 122 may generate a motion vector that includes a value corresponding to the amount of movement in the opposite direction to the movement of the camera module 20.

In an exemplary embodiment, the motion vector calculation unit 122 may be a PID controller 123 that receives a feedback signal indicating the position of the lens 22 from the second sensor 130 so as to calculate a motion vector, as illustrated in FIG. 4.

The lens drive unit 124 may adjust the position of the lens 22 based on the motion vector calculated by the motion vector calculation unit 122. The lens drive unit 124 may adjust the position of the lens 22 in a PWM manner or in a linear manner.

Figure 5:
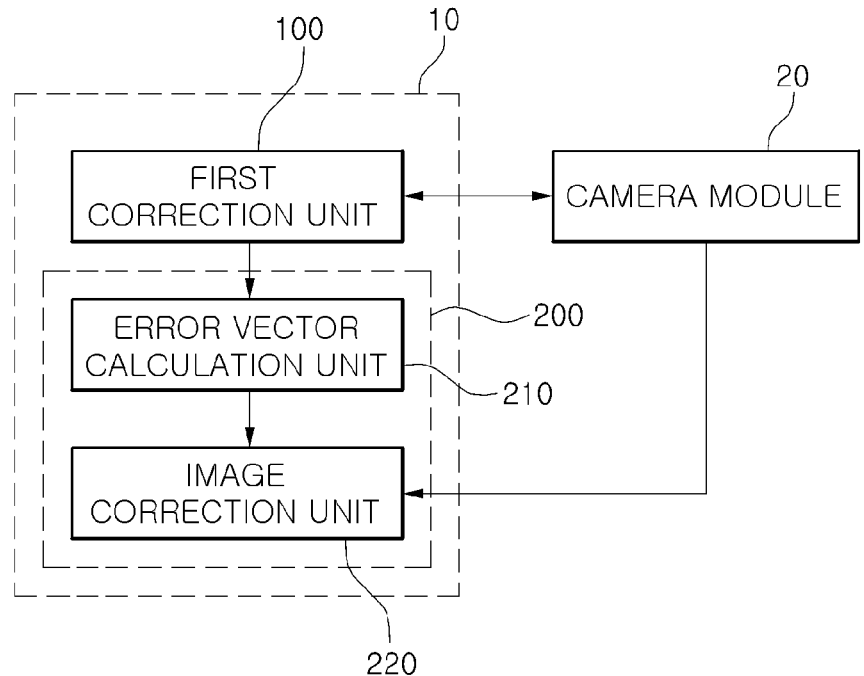
FIG. 5 is a block diagram of an example of the second correction unit illustrated in FIG. 1.
Figure 6:
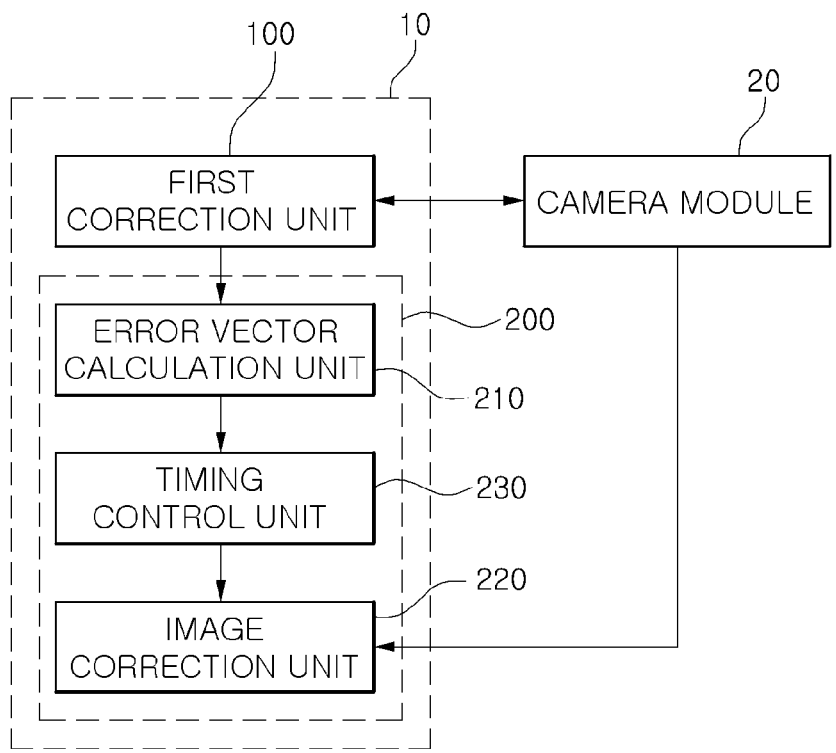
FIG. 6 is a block diagram of another example of the second correction unit illustrated in FIG. 1.
Figure 7:
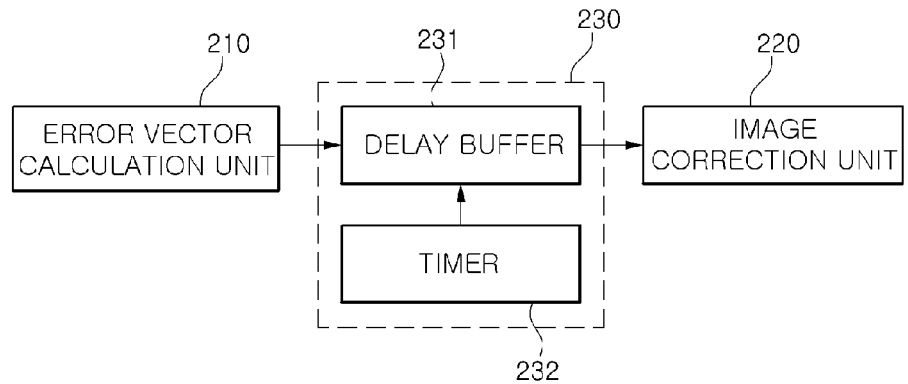
FIG. 7 is a block diagram of an example of a timing control unit illustrated in FIG. 6.

FIG. 5 is a block diagram of an example of the second correction unit illustrated in FIG. 1, FIG. 6 is a block diagram of another example of the second correction unit illustrated in FIG. 1, and FIG. 7 is a block diagram of an example of a timing control unit illustrated in FIG. 6.

Referring to FIGS. 5 and 6, the second correction unit 200 according to an exemplary embodiment of the present disclosure may include an error vector calculation unit 210 calculating error vectors in the first correction unit 100, and an image correction unit 220 correcting an image using the error vector.

The second correction unit 200 may further include a timing control unit 230 adjusting timings at which the error vector calculated by the error vector calculation unit 210 is transmitted to the image correction unit 220.

The motion vector calculation unit 210 may calculate error vectors using the position of the lens 22 and the movement of the camera module 20 sensed by the first correction unit 100.

Specifically, the error vector calculation unit 210 may calculate error vectors based on the movement value of the camera module 20 sensed by the first sensor 110 and the position value of the lens 22 sensed by the second sensor 130. In an exemplary embodiment, the error vector calculation unit 210 may compare the pitch values and yaw values sensed by the first sensor 110 with an x-coordinate value and a y-coordinate value sensed by the second sensor 130 so as to calculate error vectors. In an exemplary embodiment, the error vector calculation unit 210 may be operated only while a shutter 26 of the camera module 20 is open.

The image correction unit 220 may correct an image generated by the image generation unit 24 in the camera module 20 based on the error vector calculated by the error vector calculation unit 210.

In an exemplary embodiment, the image correction unit 220 may perform deconvolution on the error vector and an image generated by the image generation unit 24 using an image restoration filter, so as to correct image blur.

The timing control unit 230 may transmit the calculated errors vector to the image correction unit 220 in response to the state of the shutter 26 of the camera module 20.

In an exemplary embodiment, the timing control unit 230 may extract error vectors while the shutter 26 of the camera module 20 is open, i.e., while an image is generated, so as to transmit it to the image correction unit 220.

Specifically, the timing control unit 230 may receive an on/off signal for the shutter 26 from the camera module 20 so as to determine the state of the shutter 26 and may extract error vectors calculated while the shutter 26 is open from among the error vector calculation unit 210 so as to transmit the error vectors to the image correction unit 220.

In an exemplary embodiment, the timing control unit 230 may include a delay buffer 231 and a timer 232, as illustrated in FIG. 7.

The delay buffer 231 may apply to the error vectors transmitted from the error vector calculation unit 210 a time delay provided from the timer 232 if there is a time difference between a time at which the on/off signal for the shutter 26 transmitted from the camera module 20 is transmitted and when the shutter is actually opened/closed, to thereby transmit them to the image correction unit 220.

The timer 232 may provide a delay time corresponding to a time difference in the case of a time difference between a time at which the on/off signal for the shutter 26 transmitted from the camera module 20 is transmitted and when the shutter is actually opened/closed.

Figure 8:
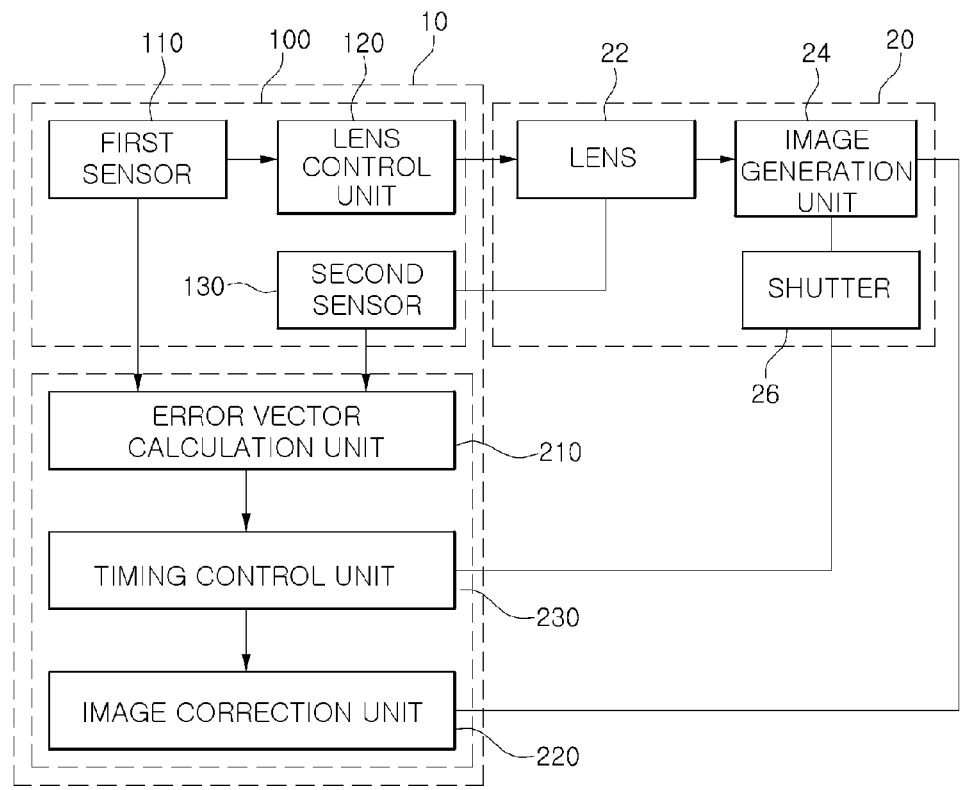
FIG. 8 is a block diagram of an apparatus for correcting an image according to another exemplary embodiment of the present disclosure.

FIG. 8 is a block diagram of an apparatus for correcting an image according to another exemplary embodiment of the present disclosure.

Referring to FIG. 8, an apparatus for correcting an image according to the another exemplary embodiment of the present disclosure may include a gyro sensor 110 sensing angular velocity of a camera module 20; a lens control unit 120 calculating a motion vector corresponding to the sensed angular velocity and adjusting a position of a lens 22 in the camera module 20 based on the motion vector; a hall sensor 130 sensing the position of the lens 22; an error vector calculation unit 210 comparing a movement distance value corresponding to an angular velocity value of the camera module 20 sensed by the gyro sensor 110 with a position value of the lens 22 sensed by the hall sensor 130 so as to calculate error vectors; a timing control unit 230 extracting error vectors calculated while a shutter 26 of the camera module is open from among the calculated error vectors; and an image correction unit correcting an image captured by the lens 22 based on the extracted error vectors.

Figure 9:
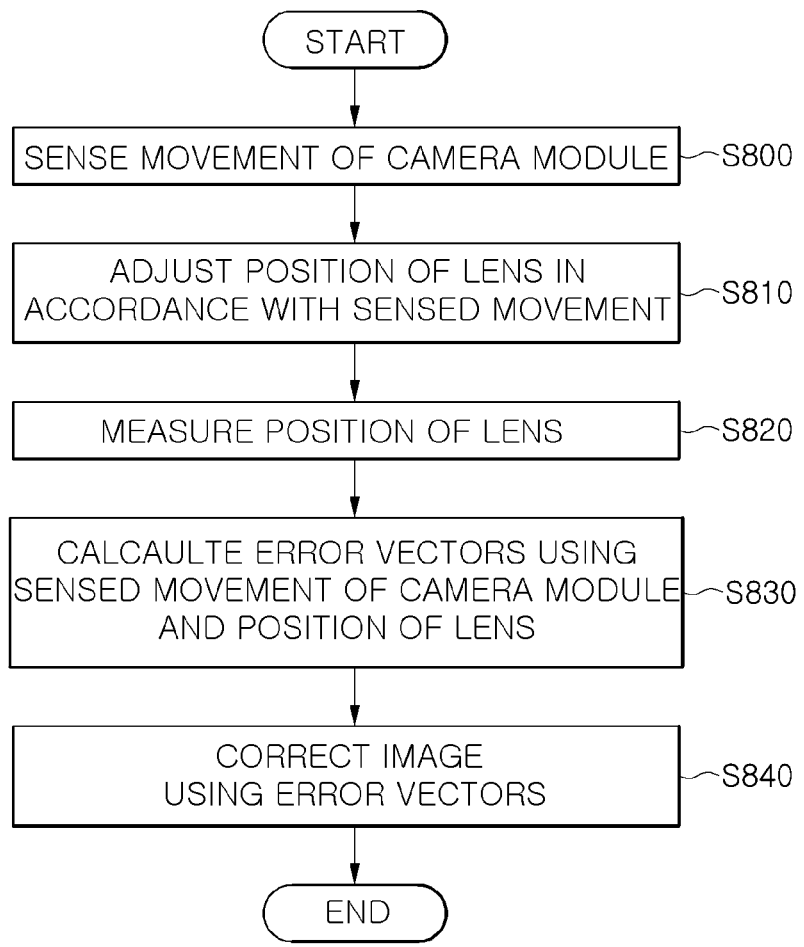
FIG. 9 is a flowchart for illustrating a method for correcting an image according to an exemplary embodiment of the present disclosure.
Figure 10:
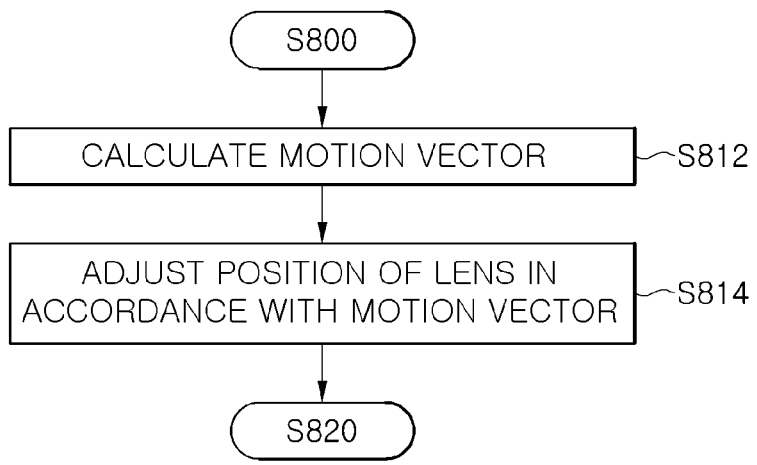
FIG. 10 is a flowchart for illustrating an example of adjusting of the position of a lens of the method illustrated in FIG. 9.
Figure 11:
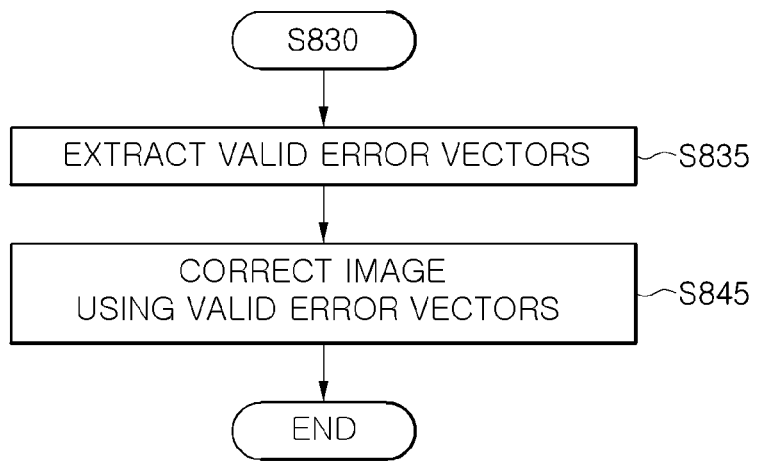
FIG. 11 is a flowchart for illustrating a method for correcting an image according to another exemplary embodiment of the present disclosure.

FIG. 9 is a flowchart for illustrating a method for correcting an image according to an exemplary embodiment of the present disclosure, FIG. 10 is a flowchart for illustrating an example of adjusting of the position of a lens of the method illustrated in FIG. 9, and FIG. 11 is a flowchart for illustrating a method for correcting an image according to another exemplary embodiment of the present disclosure.

The method for correcting an image illustrated in FIG. 9 according to the exemplary embodiment is performed by the apparatus 10 for correcting an image described above with reference to FIGS. 1 through 8, and thus redundant descriptions will not be made.

Referring to FIG. 9, the apparatus 10 for correcting an image may sense movement of the camera module 20 (S800). Then, the apparatus 10 for correcting an image may adjust the position of the lens 22 in accordance with the sensed movement of the camera module 20. Then, the apparatus 10 for correcting an image may sense the position of the lens 22 (S820) and may calculate error vectors based on the sensed movement value of the camera module 20 and the position value of the lens 22 (S830).

Then, the apparatus 10 for correcting an image may correct an image captured by the camera module 20 based on the calculated error vector (S840).

In an exemplary embodiment, as illustrated in FIG. 10, the adjusting of the position of the lens S810 may include calculating a motion vector of the lens 22 corresponding to the sensed movement of the camera module 20 (S812), and adjusting the position of the lens 22 according to the calculated motion vector of the lens 22 (S814).

In an exemplary embodiment, the operations S800 to S830 may be performed only while a shutter of the camera module 20 is open and may be repeatedly performed a predetermined number of times depending on the period of time for which the shutter of the camera module 20 is open.

In another exemplary embodiment, as illustrated in FIG. 11, the method for correcting an image may include, after the calculating of the error vector S830, extracting valid error vectors calculated while the shutter 26 of the camera module 20 is open from among the calculated error vectors (S835), and correcting an image using the extracted valid error vectors (S845).

As set forth above, according to exemplary embodiments of the present disclosure, error vectors are calculated based on movement of a camera module sensed by a first sensor and a position of a lens sensed by a second sensor, and an image is corrected based thereon, so that a clearer image can be obtained.

While exemplary embodiments have been shown and described above, it will be apparent to those skilled in the art that modifications and variations could be made without departing from the spirit and scope of the present disclosure as defined by the appended claims.

What is claimed is:

1. An apparatus for correcting an image, comprising:
a first correction unit configured to measure movement of a camera module and a position of a lens in the camera module and adjust the position of the lens in the camera module in accordance with the movement; and
a second correction unit configured to calculate error vectors using the measured movement value of the camera module and the position value of the lens and correct an image from the camera module using the error vectors.

2. The apparatus of claim 1, wherein the second correction unit includes:
an error vector calculation unit configured to calculate the error vectors using the measured movement value of the camera module and the position value of the lens; and
an image correction unit configured to correct the image from the camera module using the error vectors.

3. The apparatus of claim 2, wherein the second correction unit further includes a timing control unit configured to transmit the calculated error vectors in response to a state of a shutter of the camera module to the image correction unit.

4. The apparatus of claim 3, wherein the timing control unit extracts error vectors calculated while the shutter is open from among the calculated error vectors so as to transmit the error vectors to the image correction unit.

5. The apparatus of claim 4, wherein the timing control unit includes:
a timer configured to output a delay time corresponding to a time difference in the case of a time difference between a time at which an on/off signal for the shutter transmitted from the camera module is transmitted and when the shutter is actually opened/closed; and
a delay buffer configured to apply the delay time to the error vectors transmitted from the error vector calculation unit so as to transmit the error vectors to the image correction unit.

6. The apparatus of claim 1, wherein the first correction unit includes:
a first sensor configured to measure movement of the camera module;
a lens control unit configured to adjust the position of the lens in the camera module in accordance with the movement of the camera module measured by the first sensor; and
a second sensor configured to measure the position of the lens.

7. The apparatus of claim 6, wherein the lens control unit adjusts the position of the lens in such a manner as to counteract the movement of the camera module sensed by the first sensor.

8. The apparatus of claim 6, wherein the first sensor senses angular velocity of the camera module, and the lens control unit calculates a motion vector of the lens corresponding to the angular velocity of the camera module sensed by the first sensor and adjusts the position of the lens according to the calculated motion vector of the lens.

9. The apparatus of claim 8, wherein the second correction unit compares a movement distance value corresponding to an angular velocity value sensed by the first sensor with a position value of the lens sensed by the second sensor so as to calculate the error vectors.

10. The apparatus of claim 8, wherein the motion vector is calculated by integrating the angular velocity value sensed by the first sensor.

11. The apparatus of claim 6, wherein the lens control unit includes:
a motion vector calculation unit configured to calculate a motion vector of the lens corresponding to the movement of the camera module sensed by the first sensor; and
a lens drive unit configured to adjust the position of the lens based on the calculated motion vector of the lens.

12. The apparatus of claim 11, wherein the motion vector calculation unit is a PID controller receiving a feedback signal indicating the position of the lens from the second sensor to calculate the motion vector.

13. The apparatus of claim 6, wherein the first sensor is a gyro sensor detecting angular velocity of the camera module.

14. The apparatus of claim 6, wherein the second sensor is a hall sensor detecting the position of the lens.

15. An apparatus for correcting an image, comprising:
a gyro sensor configured to sense angular velocity of a camera module;
a lens control unit configured to calculate a motion vector corresponding to the sensed angular velocity and adjust a position of a lens in the camera module based on the motion vector;
a hall sensor configured to sense the position of the lens;
an error vector calculation unit configured to compare a movement distance value corresponding to an angular velocity value of the camera module sensed by the gyro sensor with a position value of the lens sensed by the hall sensor so as to calculate error vectors;
a timing control unit configured to extract error vectors calculated while a shutter of a camera module is open from among the calculated error vectors; and an image correction unit configured to correct an image captured by the lens based on the extracted error vectors.

16. The apparatus of claim 15, wherein the lens control unit calculates a motion vector of the lens corresponding to the angular velocity of the camera module sensed by the gyro sensor and adjusts the position of the lens based on the calculated motion vector of the lens.

17. The apparatus of claim 15, wherein the motion vector is calculated by integrating the angular velocity value sensed by the gyro sensor.

18. The apparatus of claim 15, wherein the lens control unit includes:
   a motion vector calculation unit configured to calculate a motion vector of the lens corresponding to the angular velocity of the camera module sensed by the gyro sensor; and
   a lens drive unit configured to adjust the position of the lens based on the calculated motion vector of the lens.

19. The apparatus of claim 18, wherein the motion vector calculation unit is a PID controller receiving a feedback signal indicating the position of the lens from the hall sensor to calculate the motion vector.

20. A method for correcting an image, comprising:
   a) sensing movement of a camera module;
   b) adjusting a position of a lens in the camera module in accordance with the sensed movement of the camera module;
   c) sensing the position of the lens;
   d) calculating error vectors based on the sensed movement of the camera module and the sensed position of the lens; and
   e) correcting an image from the camera module based on the error vectors.

21. The method of claim 20, wherein a) the adjusting of the position of the lens includes:
   calculating a motion vector of the lens corresponding to the sensed movement of the camera module; and
   adjusting the position of the lens based on the calculated motion vector of the lens.

22. The method of claim 20, further comprising extracting valid error vectors calculated while the shutter of the camera module is open from among the calculated error vectors, between d) the calculating of the error vectors and e) the correcting of the image,
   wherein e) the correcting of the image includes correcting the image using the calculated valid error vectors.

23. The method of claim 20, wherein the operations a) to d) are repeatedly performed a predetermined number of times depending on the period of time for which the shutter of the camera module is open.

\* \* \* \* \*